(12) United States Patent
Takahashi et al.

(10) Patent No.: US 6,243,139 B1
(45) Date of Patent: *Jun. 5, 2001

(54) APPARATUS FOR BLOCK-ENCODING INPUT IMAGE SIGNALS

(75) Inventors: Koji Takahashi, Chigasaki; Motokazu Kashida, Musashino, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,621

(22) Filed: Jun. 27, 1997

Related U.S. Application Data

(63) Continuation of application No. 08/359,541, filed on Dec. 20, 1994, now abandoned.

(30) Foreign Application Priority Data

Dec. 22, 1993 (JP) .................................................. 5-324571
Dec. 28, 1993 (JP) .................................................. 5-337471

(51) Int. Cl.⁷ ...................................................... H04N 7/12
(52) U.S. Cl. ........................... 348/420; 386/109; 386/112; 382/232
(58) Field of Search .............................. 360/9.1, 27, 33.1, 360/32, 67, 31, 53, 22; 358/335, 339; 369/53, 54; 348/420, 384, 390, 400, 401, 402, 403, 409–413; 386/109, 111, 112, 93, 9, 33; 382/232, 236, 238, 248–251

(56) References Cited

U.S. PATENT DOCUMENTS

| | | | |
|---|---|---|---|
| 4,792,851 | * 12/1988 | Mochizuki | 348/402 |
| 5,055,927 | * 10/1991 | Keesen et al. | 358/133 |
| 5,065,259 | * 11/1991 | Kubota et al. | 360/9.1 X |
| 5,091,782 | * 2/1992 | Krause et al. | 358/135 |
| 5,198,940 | * 3/1993 | Nagasawa et al. | 360/32 X |
| 5,274,442 | * 12/1993 | Murakami et al. | 348/420 X |
| 5,353,063 | 10/1994 | Yagisawa et al. | 348/426 |
| 5,544,266 | * 8/1996 | Koppelmans et al. | 382/238 |
| 5,557,417 | * 9/1996 | Ishii | 360/31 X |
| 5,561,529 | * 10/1996 | Tanaka et al. | 386/77 |

* cited by examiner

*Primary Examiner*—Andrew L. Sniezek
(74) *Attorney, Agent, or Firm*—Fitzpatrick, Cella, Harper & Scinto

(57) ABSTRACT

There is provided an apparatus capable of preventing the image quality deterioration, in the block encoding of an image signal which has already been subjected to encoding, such as in the dubbing operation, by entering block forming information relating to the block forming operation applied previously to the image signal, at the entry of the image signal, and dividing the image signal into blocks according to the block forming information.

28 Claims, 17 Drawing Sheets

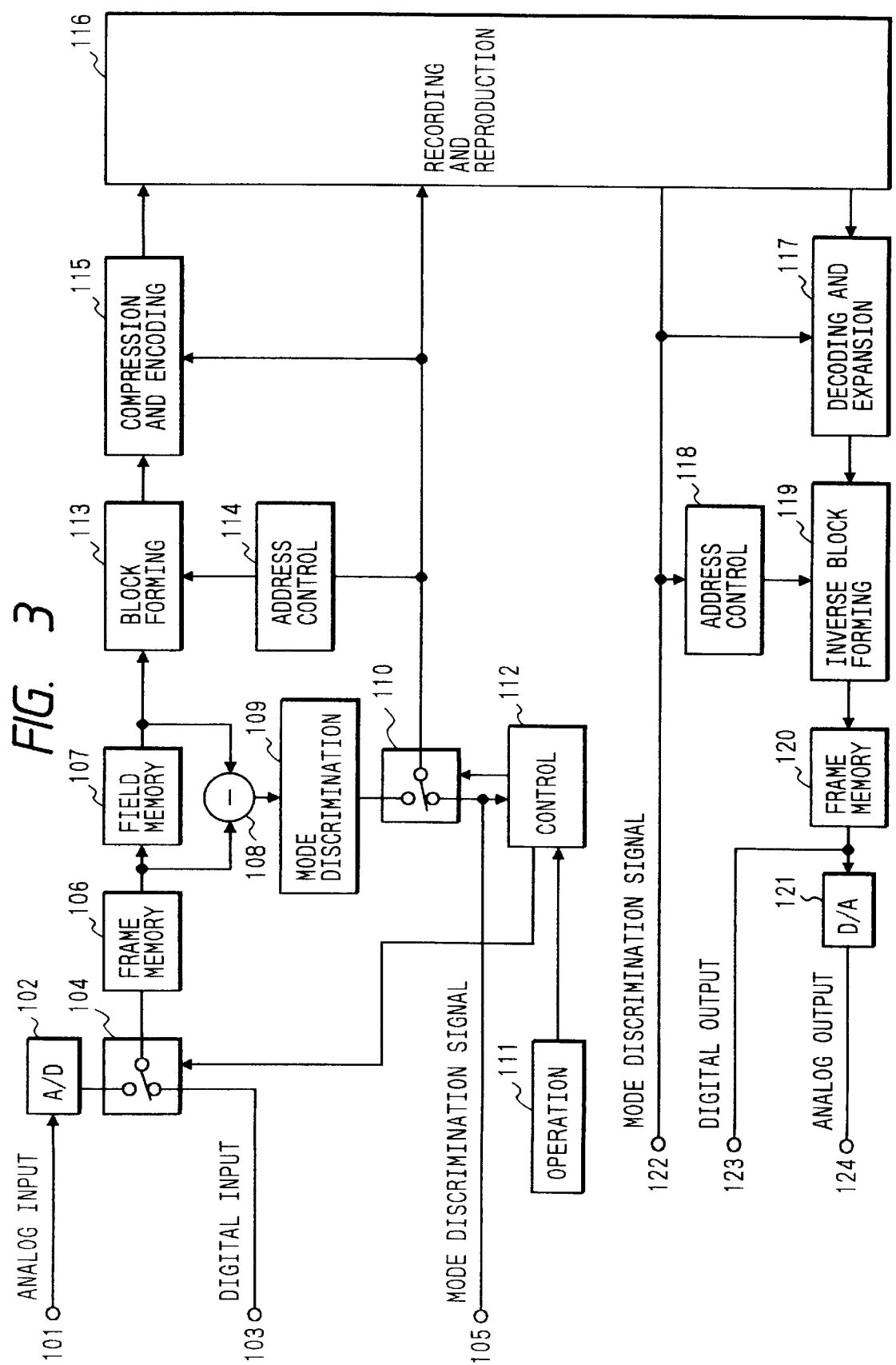

FRAME PROCESSING (8×8)

ODD FIELD

EVEN FIELD

FIELD PROCESSING (8×4×2)

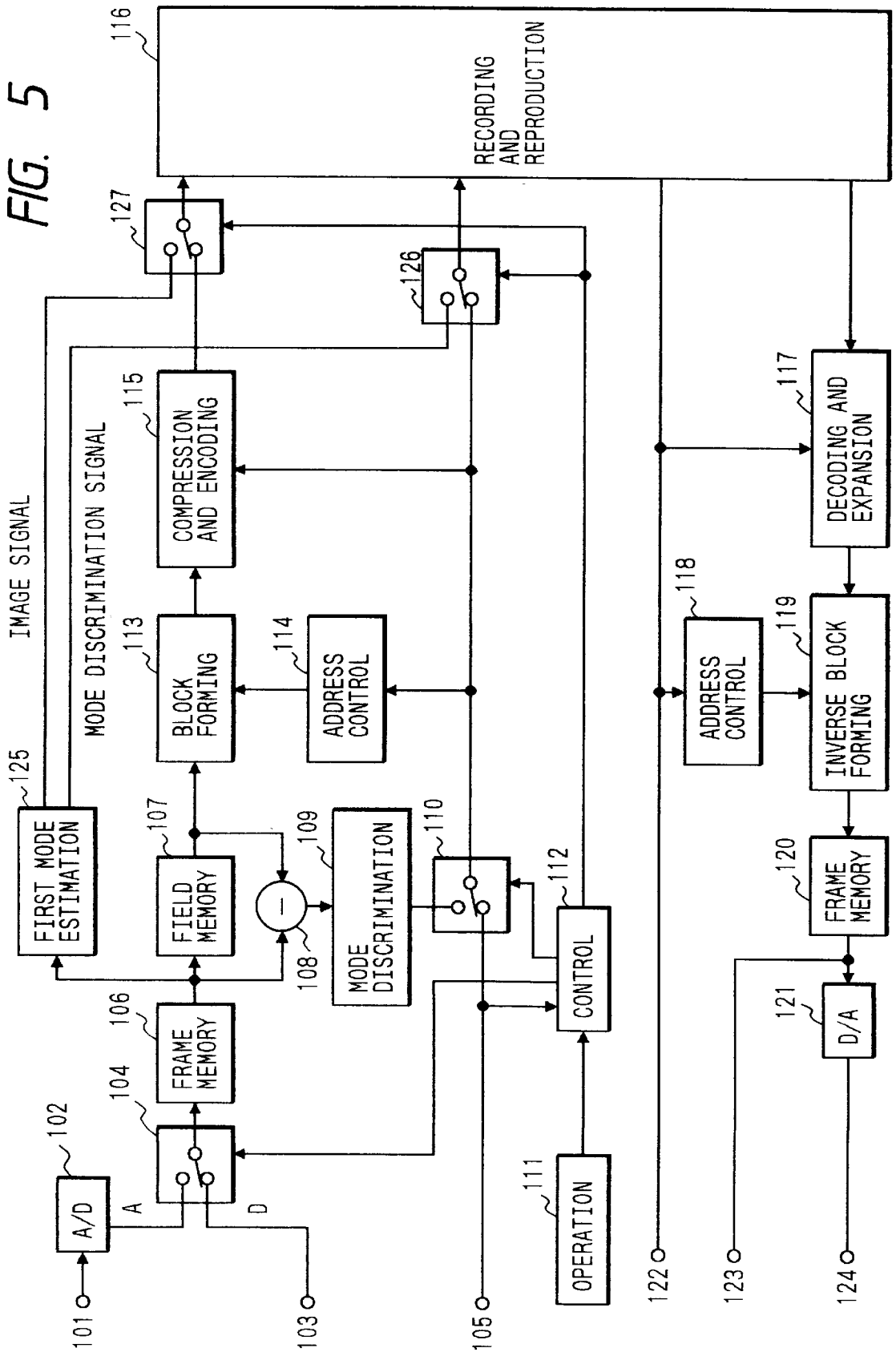

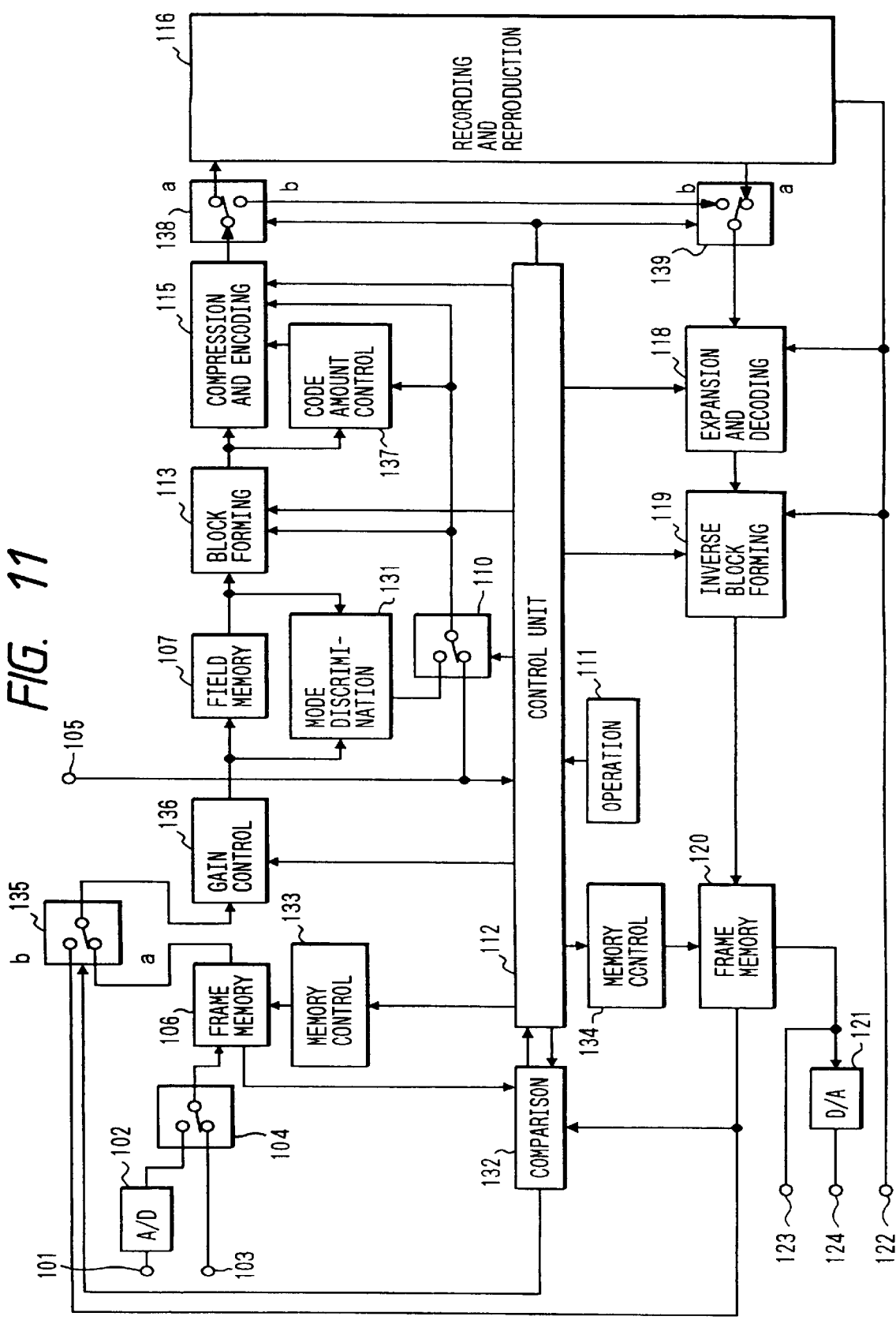

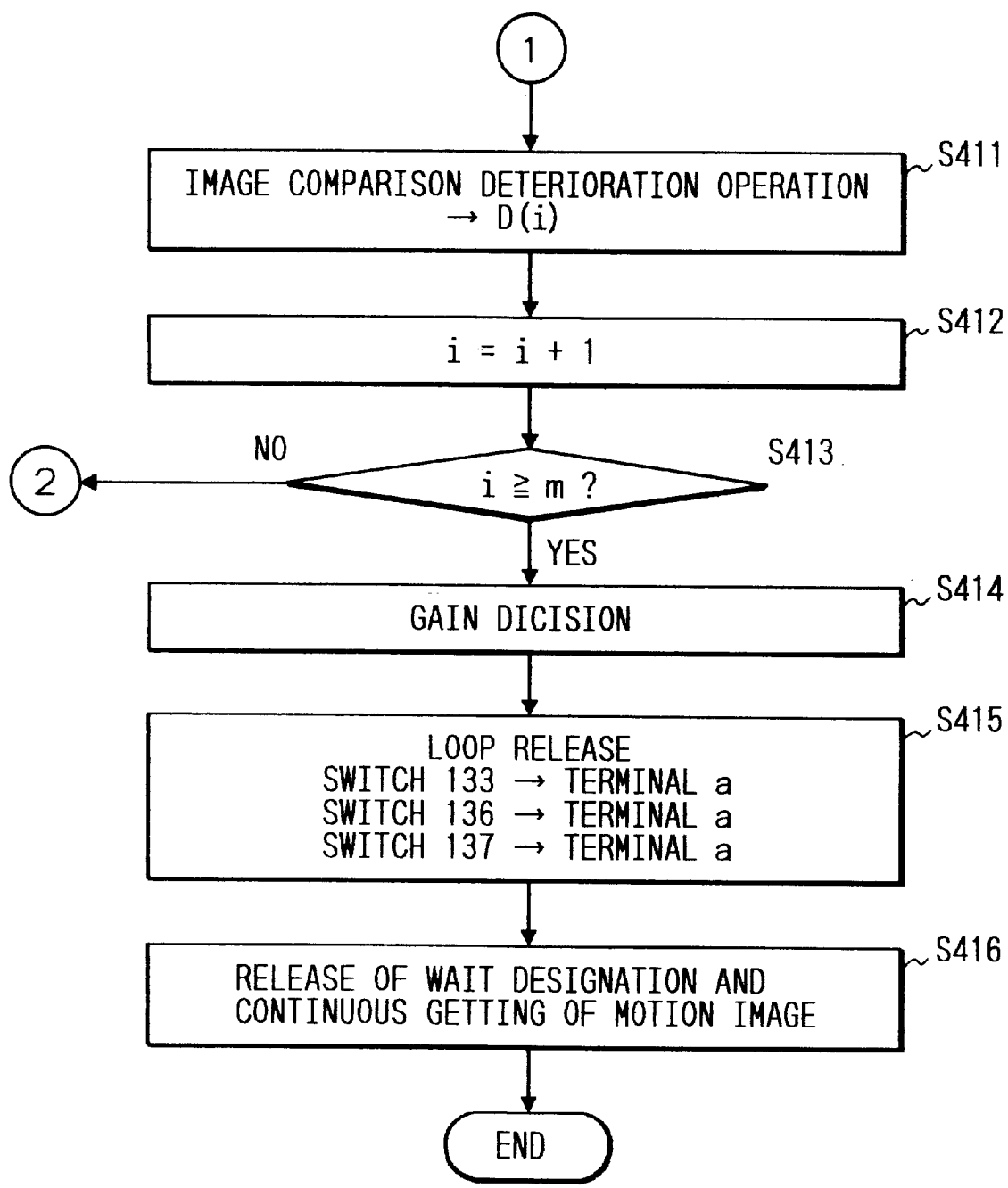

APPARATUS FOR BLOCK-ENCODING INPUT IMAGE SIGNALS

This application is a continuation of application Ser. No. 08/359,541, filed Dec. 20, 1994, now abandoned.

BACKGROUND OF THE INVENTION

1. Field of the Invention

The present invention relates to an image processing apparatus, and more particularly to an apparatus for block encoding of an input image signal.

2. Related Background Art

In the field of such apparatus, there has already been known a digital VTR (video tape recorder) for digitizing image signals and effecting the recording and reproduction there of after block encoding.

In such a digital VTR, the correlation of the fields within a frame is usually discriminated at the compression and encoding of the digital image signal, and a frame process and a field process are switched according to the correlation, in order to reduce the amount of code at the encoding by a process of higher correlation, thereby controlling the code amount so as to conform to the code amount defined by the format of each digital VTR.

In such a digital VTR, the dubbing operation in digital signal form from another equipment such as a VTR is usually conducted, as shown in FIG. 1, by reproducing the image signal in digital format from a digital VTR 1, and recording said signal in a digital VTR 2. Also in such a dubbing operation of the image signal already recorded and reproduced in a digital VTR, the frame and field processes are switched by discrimination of the correlation of the fields, as in the first recording.

Such a dubbing operation between the digital VTR's can be most simply achieved with digital data, but, for the protection of copyright, there is conceived a method of avoiding the digital interface and conducting the dubbing after the digital data are returned to analog form.

Such analog connection provides an additional advantage of compatibility with conventional analog equipment, such as a title/illustration inserting equipment or an effecter 3 for achieving a wiping/fading effect, as shown in FIG. 2.

However, in the aforementioned dubbing between the digital VTR's, the switching of the frame/field process at the digital recording of the image signal is conducted in the recording VTR, based on the correlation of the fields, so that the re-encoding process at the recording VTR may become different from the initial encoding process (prior to dubbing). As a result, there may occur significant deterioration of the image.

More specifically, in such a dubbing operation, because of transmission errors in the analog transmission channel, representative values of the quantization at the re-encoding in the recording VTR may be different from those in the initial or preceding quantization. As a result, the representative values of quantization are aberrated from the original values as the dubbing operation is repeated, thus eventually resulting in significant deterioration of the image quality.

Also in the dubbing of the signal reproduced from an analog VTR, the formation of the optimum pixel blocks may be hindered by the loss of image correlation, resulting from variable time-base components, such as jitter (principally caused by mechanical reasons), generally contained in the reproduced signal.

SUMMARY OF THE INVENTION

In consideration of the foregoing, an object of the present invention is to resolve the drawbacks mentioned above.

Another object of the present invention is to provide an apparatus, capable of preventing deterioration of the image quality, in the dubbing from a digital VTR or in the recording of the image signal.

The above-mentioned objects can be attained, according to an aspect of the present invention, by an image processing apparatus, comprising image input means for entering an image signal, block forming means for dividing said image signal into blocks, each containing a predetermined number of pixels, and information input means for entering block forming information relating to said block forming process applied previously to said image signal, wherein said block forming means is adapted to effect said block forming process according to the block forming information from said information input means.

Still another object of the present invention is to provide an apparatus capable of preventing the deterioration in image quality, resulting from a level variation in the analog transmission channel or a level variation by connection with another equipment.

The above-mentioned object can be attained, according to another aspect of the present invention, by an image processing apparatus, comprising level control means for controlling the level of an input image signal, compression means for compressing the amount of information of the image signal from said level control means, expansion means for expanding the amount of information of the image signal compressed by said compression means, detection means for detecting the deterioration in image quality of said input image signal, resulting from said compression and expansion, and control means for controlling said level control means according to the output of said detection means.

Still other objects of the present invention, and the features thereof, will become fully apparent from the following detailed description of the embodiments, to be taken in conjunction with the attached drawings.

BRIEF DESCRIPTION OF THE DRAWINGS

FIG. 3 is block diagram of a digital VTR constituting a first embodiment of the present invention;

FIG. 5 is block diagram of a digital VTR constituting a second embodiment of the present invention;

FIG. 11 is block diagram of a digital VTR constituting a fourth embodiment of the present invention;

DETAILED DESCRIPTION OF THE PREFERRED EMBODIMENTS

Figure 1:
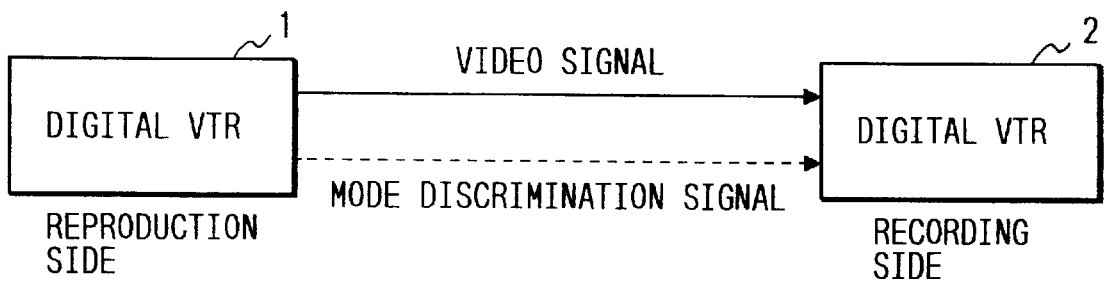
FIG. 1 is a view showing the mode of image signal dubbing in digital form from one digital VTR to another.
Figure 2:
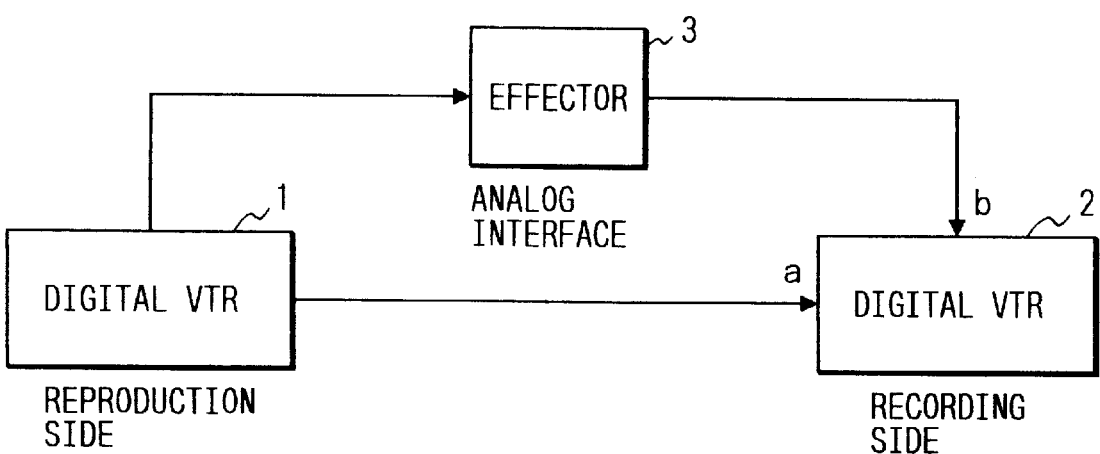
FIG. 2 is a view showing the mode of image signal dubbing in analog form from one digital VTR to another.

Now the present invention will be clarified in detail by embodiments thereof shown in the attached drawings.

At first there will be explained a first embodiment of the present invention, with reference to FIG. 3, which is a block diagram of a digital VTR embodying the present invention.

Referring to FIG. 3, an analog image signal entered from an analog input terminal 101 is converted by an A/D converting circuit 102 into a digital signal, which is stored, through a switch 104, in a frame memory 106.

Also, a digital image signal, entered from a digital input terminal 103, is stored in the frame memory 106 through the switch 104.

In this embodiment, said switch 104 is controlled by a control circuit 112 receiving instructions from an operation unit 111, but it may also be automatically shifted by a control circuit 112 according to the discrimination of the kind of the input image signal.

The frame memory 106 effects a shuffling process on the input image signal, and sends, in each frame, the image signal of 8 pixels in the vertical direction by 8 pixels in the horizontal direction to a field memory 107 and a subtraction circuit 108. The subtraction circuit 108 determines the difference between the current input image signal and an image signal delayed by a field in the field memory 107, in the unit of 8×8 pixels, and sends said difference to a mode discrimination circuit 109.

Based on said difference, the mode discrimination circuit 109 discriminates the correlation between the current field and the preceding field, and sends said correlation, through a switch 110, to an address control circuit 112 and a compression/encoding circuit 113.

In this state, if a mode discrimination signal, indicating the encoding mode at the initial encoding, is entered from an input terminal 105, the control circuit 112 receiving said mode discrimination signal shifts the switch 110 to select the side of said input terminal 105. Said mode discrimination signal indicates, as will be explained later, whether the field process mode or the frame process mode is employed at the block formation.

The image signal read from the field memory 107 is supplied to a block forming circuit 113, and is divided therein into blocks of 8×4×2 pixels each for field mode or blocks of 8×8 pixels each for frame mode, for the compression and encoding to be conducted later.

Figure 4A:
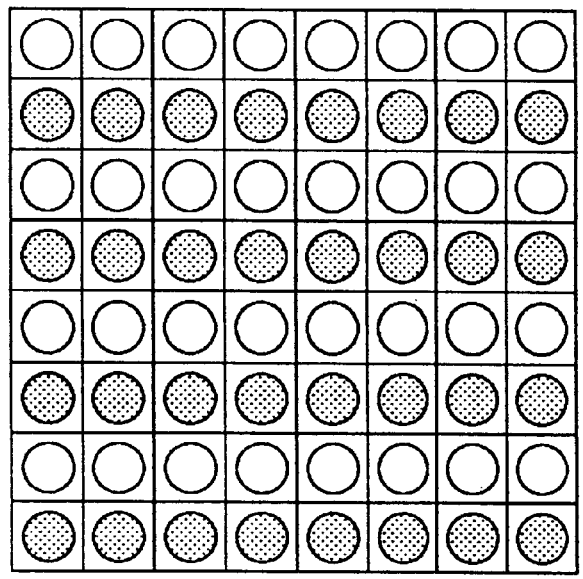
FIGS. 4A and 4B are views showing blocks to be used in the present invention.
Figure 4B:
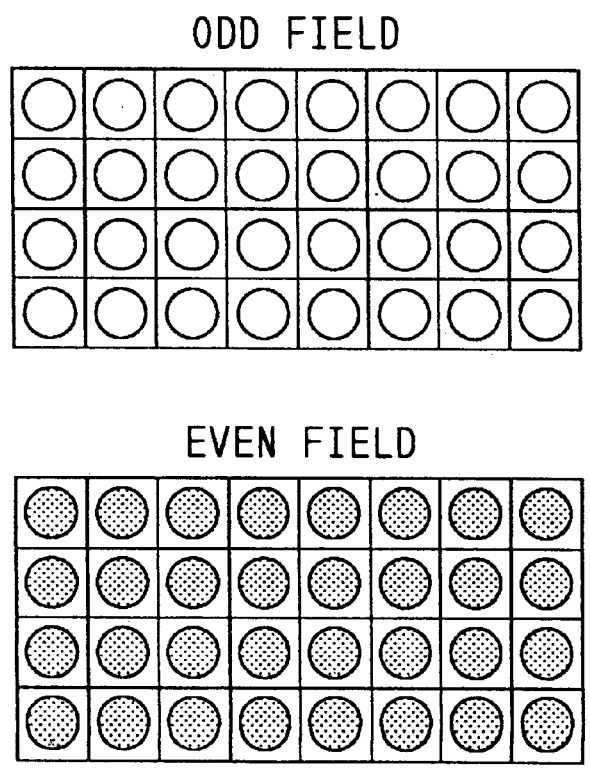

The modes of block formation in different process modes are shown in FIGS. 4A and 4B.

In the frame process mode, the image is divided into blocks of 8×8 pixels each, as shown in FIG. 4A. Also in the field process mode, the image is divided into blocks, each of which consists of 2 fields, each composed of 8×4 pixels, as shown in FIG. 4B.

Said block formation is controlled by an address control circuit 114, receiving the discrimination signal from the switch 110. The image signal, subjected to block formation with a predetermined unit in the block forming circuit 113, is supplied to the compression/encoding circuit 115 for compression and encoding by known technologies such as DCT, quantization, variable-length encoding etc., and is recorded on a magnetic tape by a record/reproduction system 116 including a digital modulation/demodulation circuit, a record/reproduction amplifier etc. In this operation, a field/frame discrimination signal from the switch 110 is also recorded.

In this state, the compression/encoding circuit 115 varies its process according to the mode discrimination signal from the switch 110. More specifically, in the frame process mode, it effects DCT and quantization for every 8×8 pixels within the frame, but, in the field process mode, it effects DCT and quantization for every 8×4 pixels within the field. Stated differently, it varies the sequential order of process in 8×8 pixels of the frame, depending on the process mode.

In the reproducing operation, the compressed and encoded image signal and the mode discrimination signal are reproduced by the record/reproduction system 116, and decoding and expansion are conducted in the decoding/expansion circuit 117.

As in the recording operation, the decoding/expansion circuit 117 varies its process according to the reproduced mode discrimination signal. More specifically, the order of pixels is varied within the 8×8 pixels.

The decoded image signal is subjected, in an inverse block forming circuit 119, to a process inverse to the process in the recording, and is supplied, in the unit of a field, to a frame memory 120. Said frame memory 120 effects a deshuffling process on the entered image signal to restore the original data sequence, and sends said image signal to a D/A conversion circuit 121, which converts said image signal into an analog signal, and sends said signal to an analog output terminal 124.

Also the image signal read from the frame memory 120 is released, in the digital state, from a digital output terminal 123, and the mode discrimination signal is simultaneously released from an output terminal 122.

In the initial encoding, as explained before, a suitable method such as detection of image movement or detection of correlation can be employed for discriminating the frame or field process, but an erroneous discrimination may occur for the image signal which has been subjected to encoding. The present embodiment utilizes the mode discrimination information at the re-encoding, so that the pixel blocks can be formed in a similar manner as the block pattern in the initial encoding, and the image quality deterioration at the re-encoding can therefore be minimized.

In the following there will be explained a 2nd embodiment of the present invention, with reference to FIGS. 5 to 8.

In the present embodiment, in case of decoding an encoded image signal into an analog signal, then re-encoding said analog signal and recording the thus obtained digital signal, the initial encoding process mode is estimated by a first mode estimation circuit 125 and the encoding process is executed according to the result of said estimation.

Referring to FIG. 5, the control circuit 112 controls the switches 104, 110 as explained before, thereby entering the image signal from the outside.

If an analog image signal is entered from the outside, the switch 104 is shifted to a side A while the switch 110 is shifted to the side of the mode discrimination circuit 109, and the block formation, compression and encoding are conducted according to the result of discrimination by the mode discrimination circuit 109.

If a digital image signal is entered, the control circuit 112 shifts the switch 104 to a side D and discriminates the kind of the input image signal, according to the presence of absence or the mode discrimination signal from the terminal 105. In case of a digital image signal accompanied by a mode discrimination signal, the switch 110 is shifted to the side of the terminal 105, while a switch 16 is shifted to the side of the switch 110, and the block formation, compression and encoding are conducted according to the entered mode discrimination signal, as in the foregoing embodiment.

On the other hand, a digital image signal not accompanied by a mode discrimination signal is estimated as an image signal already recorded and reproduced in another digital VTR. Thus, a switch 126 is shifted to the side of the first mode estimation circuit 125, and the block formation, compression and encoding are conducted according to the result of mode estimation by said circuit 125. In this state the compressed image signal is released also from the first mode estimation circuit 125 as will be explained later, so that the control circuit 112 connects a switch 127 to the first mode estimation circuit 125 to transmit the image signal therefrom to the record/reproduction circuit 116.

In the following there will be explained the specific structure of the first mode estimation circuit 125 shown in FIG. 5 and the image signal recording in the present embodiment with reference to FIGS. 6 to 8.

Figure 6:
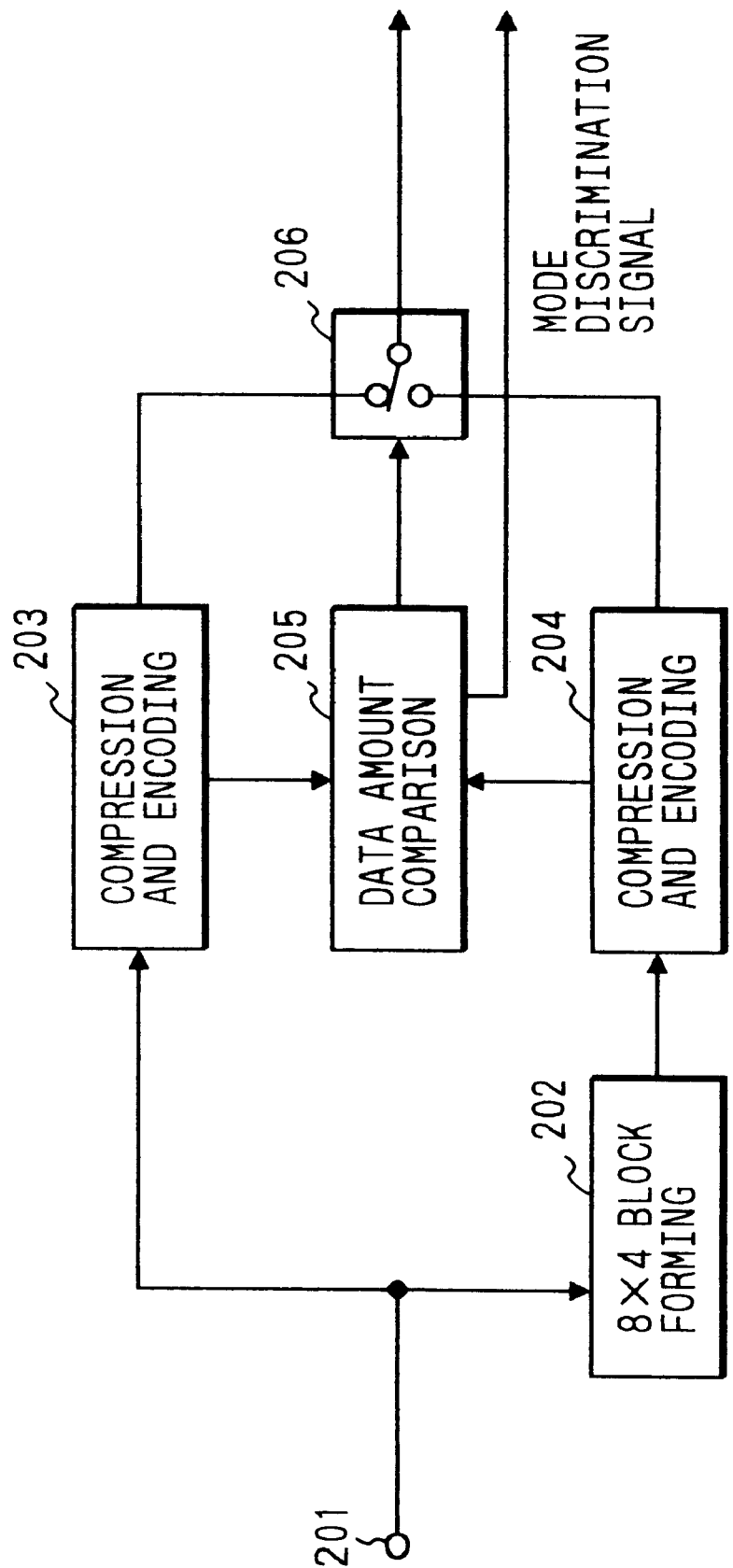
FIG. 6 is a block diagram showing an example of a first mode estimation circuit shown in FIG. 5.

At first, reference is made to FIG. 6 for explaining a first example of the first mode estimation circuit 125. The digital image signal from the frame memory 106 is entered from an input terminal 201 and supplied to a compression/encoding circuit 203 and an 8×4 block forming circuit 202.

The compression/encoding circuit 203 compresses the amount of information of the input image signal as explained before, and sends said signal to a data amount comparison circuit 205 and a switch 206.

The 8×4 block forming circuit 202 converts the image signal, entered in the unit of 8×8 pixels, into fields of 8×4 pixels each. Then a compression/encoding circuit 204 effects compression and encoding in the same manner as explained before, and the obtained signal is supplied to the data amount comparison circuit 205 and the switch 206.

The data amount comparison circuit 205 compares the code amounts of the encoded image signals from the compression/encoding circuits 203, 204 and controls the switch 206 so as to release the more appropriate image signal for supply to the switch 127 shown in FIG. 5. The term "more appropriate" has the following meaning. If the image data have already been subjected to block encoding, the amount of codes of said data should have been so adjusted, at the previous compression/encoding operation, as to reach a predetermined code amount defined for each format. In the present embodiment, therefore, the amount of codes is compared for every predetermined number of blocks, and an image signal having the code amount closer to that defined in the format of the digital VTR is selected.

Also, the data amount comparison circuit 205 releases the mode discrimination signal, determined by the results of said comparison, to the switch 126 shown in FIG. 5.

Figure 7:
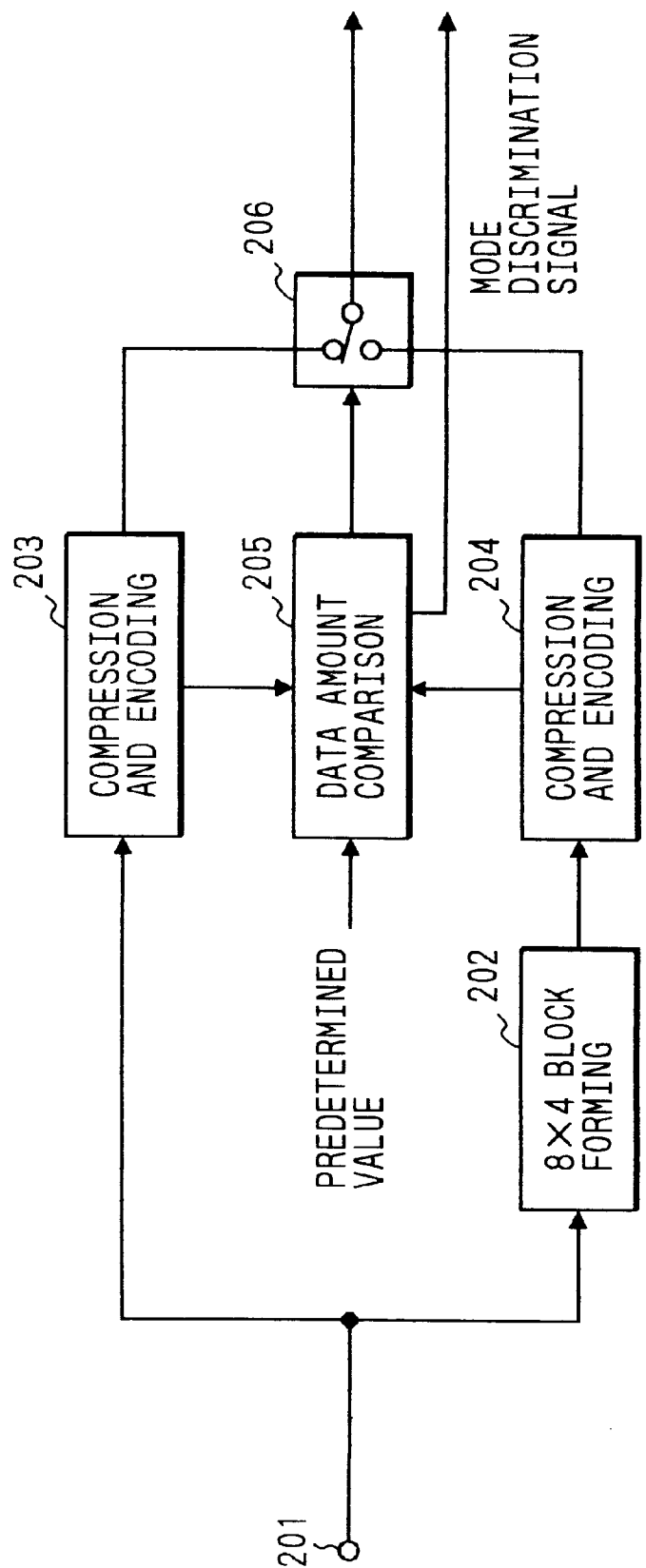
FIG. 7 is a block diagram showing another example of the first mode estimation circuit shown in FIG. 5.
Figure 8:
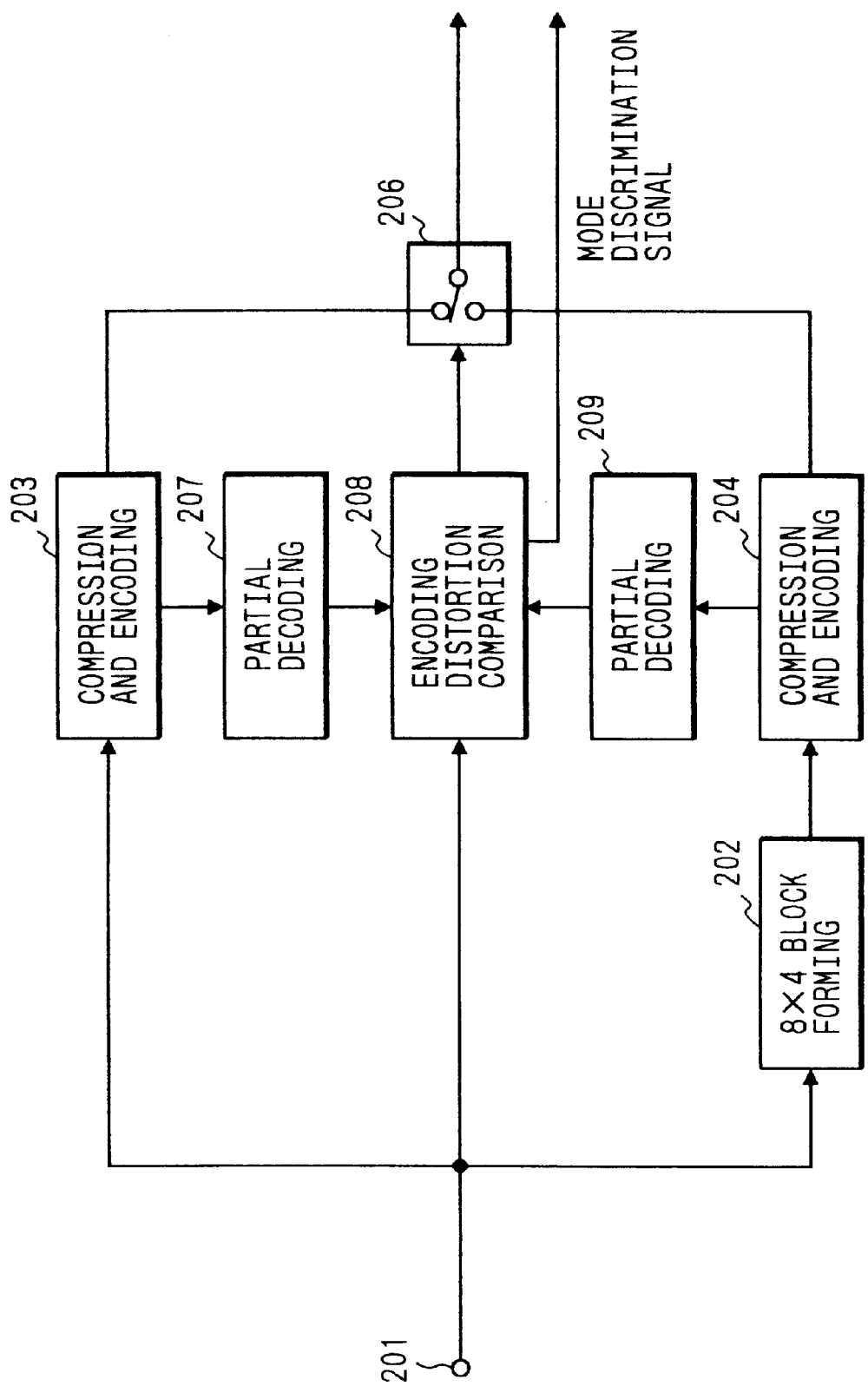
FIG. 8 is a block diagram showing still another example of the first mode estimation circuit shown in FIG. 5.

A second example of the first mode estimation circuit 125 is shown in FIG. 7. In this example, the data amount comparison circuit 205 compares the data amounts of the image data released from the compression/encoding circuits 203, 204 respectively with a predetermined value, which is a data amount per unit time (per frame in this case) defined by the format of the digital VTR, and the switch 206 selects the image data of which the data amount is closer to said predetermined value. Also, such configuration enables re-encoding similar to the initial encoding mode, as in the above-explained example.

In the following, a third example of the first mode estimation circuit 125 is explained, with reference to FIG. 8, in which the encoded image data from the compression/encoding circuits 203, 204 are partially decoded by partial decoding circuits 207, 208 and supplied to an encoding distortion comparison circuit 208. The encoding distortion comparison circuit 208 detects the differences between the image data partially decoded by the partial decoding circuits 207, 209 and the original image data entered from the frame memory 106 and calculates the encoding error in the frame and field processes. Depending on the output of said encoding distortion comparison circuit 208, the image data of smaller encoding error are selected by the switch 206 and supplied to the switch 127. Also said comparison circuit 208 sends the mode discrimination signal to the switch 126, based on the result of comparison in a similar manner as the data amount comparison circuit. The present structure also can perform several kinds of encoding processings including block configuration similar to that of the previous encoding.

As explained in the foregoing, the present embodiment can provide a pixel block configuration, at the re-encoding, similar to that in the previous encoding, since the process mode is not detected by the correlation between the fields of the input image data but the initial block formation is estimated by processing the input image signal in the frame and field modes and comparing the results.

In the present embodiment, an additional compression/encoding circuit is provided in the 1st mode estimation circuit 125, in addition to the ordinary compression/encoding circuit 115, but such configuration is not limitative. It is also possible to form frame-mode blocks and field-mode blocks through the control of the block forming circuit 113 and to effect comparison after compression and encoding of the data of both modes in the compression/encoding circuit 115. Such method dispenses with the need for plural compression/encoding circuits.

In the following, there will be explained a 3rd embodiment of the present invention, with reference to FIGS. 9 and 10.

In this embodiment there will be explained a case of recording an analog image signal reproduced from another VTR. There will also be explained two processes for said analog image signal, namely a process for an "already encoded analog signal" that has once been block encoded in another digital VTR or the like, and a process for a "variable time-base analog signal" for example reproduced from a digital VTR. In FIG. 9, the same components as those in the foregoing embodiments are represented by the same numbers.

In case of the "already encoded analog signal", which is an input analog signal that has already been recorded and reproduced in another digital VTR, the 1st mode estimation circuit 125 generates the mode discrimination signal together with the data compression.

In said case of the "already encoded analog signal", the image signal entered from the input terminal 101 is supplied to the A/D conversion circuit 102 and a line variation detection circuit 128 to be explained later. The A/D conversion circuit 102 converts the input analog image signal into a digital image signal and stores said digital image signal in the memory 106 of a capacity of at least a frame.

Then the image signal is read from the memory 106 in a manner explained before and supplied to the 1st mode estimation circuit 125.

In these operations, the timing of sampling by the A/D conversion circuit 102 and that of addressing for the memory 106 for image signal readout therefrom are controlled by a timing control circuit 129.

In the present embodiment, the control circuit 112 controls the switches according to the instructions from the operation unit 111, but said control may also be conducted by a signal entered from unrepresented input means and indicating the kind of the input image data, i.e. indicating "already encoded analog signal" or "variable time-base analog signal".

Thereafter the input image signal is compressed, in the amount of information, by the 1st mode estimation circuit 125 in the same manner as in the foregoing embodiments, and is supplied through the switch 127 to the record/reproduction circuit 116, while the mode discrimination signal is also supplied to said record/reproduction circuit 116 through a switch 126.

Thus, in case of the signal which has once been encoded, it is possible to construct the process blocks similar to those in the initial encoding, by estimating the process mode in said initial encoding, thereby preventing the deterioration of the image quality.

Now there will be explained the process for the "variable time-base analog signal". In this case, as in the case of entry of the analog image signal in the foregoing embodiment, the control circuit 112 connects the switch 110 to the side of the mode discrimination circuit 131, and the block formation, compression and encoding are conducted according to the mode discrimination signal from said circuit 131.

Figure 10:
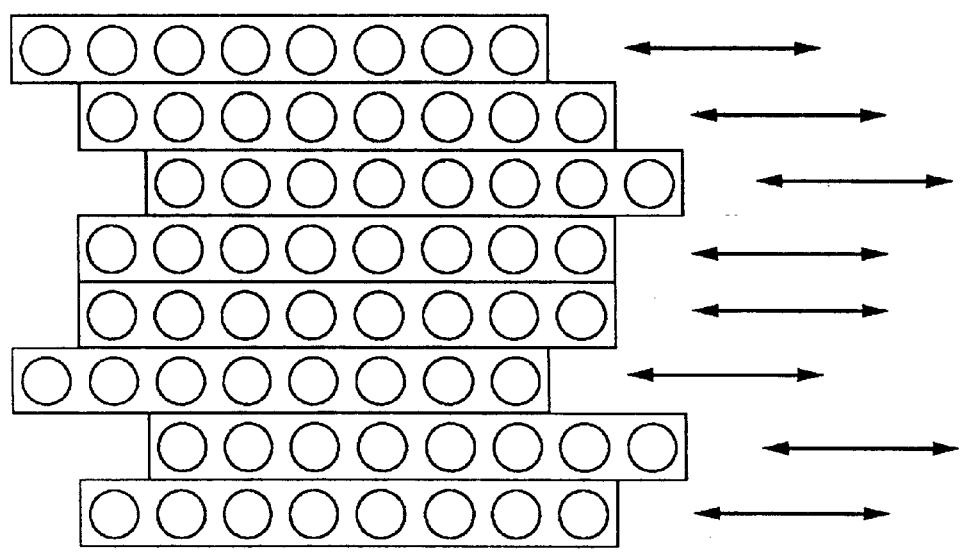
FIG. 10 is a view showing the mode of variation in the image signal to be handled in the embodiments of the present invention.

The image signal reproduced from an analog VTR may contain a variation in the time base in each horizontal line, so that shifts in the horizontal direction may occur as shown in FIG. 10. In the present embodiment, therefore, for compensating such horizontal shifts, the A/D conversion is conducted by a sampling operation with a margin of 1 block (8 pixels) in the horizontal direction. More specifically, if the effective image area has, for example, 480 pixels in the vertical direction and 720 pixels in the horizontal direction, the effective sampling area is widened, by adding 4 pixels at the right and at the left, to 480 pixels in the vertical direction and 728 pixels in the horizontal direction.

Figure 9:
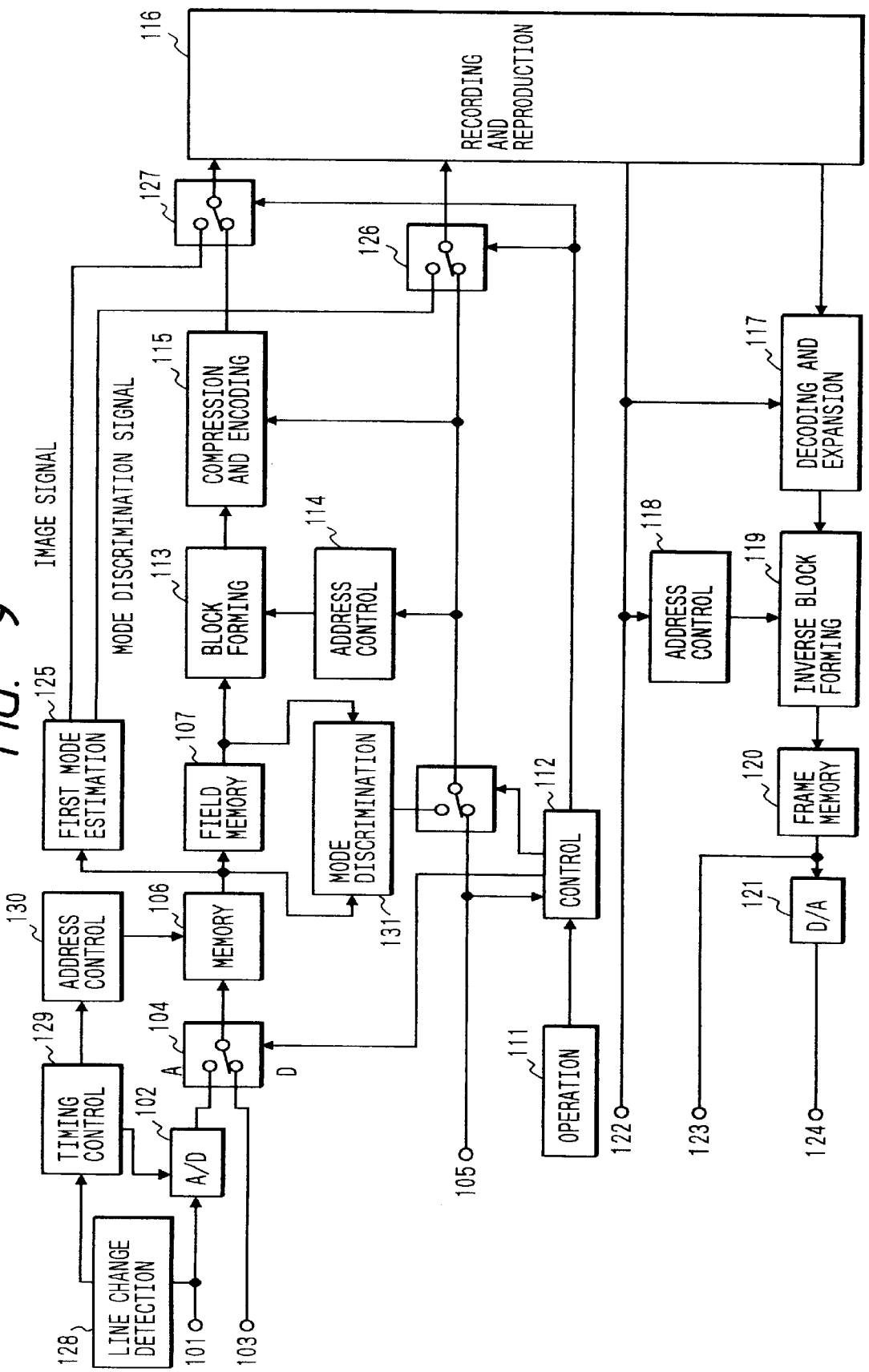
FIG. 9 is block diagram of a digital VTR constituting a third embodiment of the present invention.

In the circuit shown in FIG. 9, when an analog image signal involving the above-mentioned variation in the time base is entered, the line variation detection circuit 128 detects said line variation, by detecting the horizontal synchronization signal in the input image signal. Based on the output signal from said circuit 128, the timing control circuit 129 adjust the timing of sampling in the A/D conversion circuit 102, and controls the write-in address so as to cancel the variation shown in FIG. 10.

Such a configuration provides the image signal, stored in the memory 106, without the variation in time base in the horizontal direction. The cancellation of variation may also be achieved, instead of control of the write-in address for the memory 106, by control of the read-out address of the memory 106 with an uncontrolled write-in operation.

The image signal, from which the variation in time base is thus eliminated, is then subjected to the block formation, compression and encoding, based on the mode discrimination signal from the mode discrimination circuit 131, in the same manner as explained before, and is recorded on the magnetic tape.

In the following there will be explained the discriminating operation of the mode discrimination circuit 131 in the present embodiment. The mode discrimination in this embodiment utilizes the DCT calculation in the compression/encoding circuit 115.

The image correlation between the fields, particularly the correlation in the vertical direction, for mode discrimination can be detected by the detection of differences among the horizontal in each image frame, but, if a DCT image processing circuit is present as in the present embodiment, such DCT circuit can be effectively utilized for the detection of correlation. The correlation can be considered high or low respectively if the low frequency components or high frequency components are prevalent in the result of DCT calculation. Consequently, the frequency components in the vertical direction can be inspected for detecting the correlation in the output signal of the analog VTR.

Thus the present embodiment effects the DCT calculation at the detection of correlation, for detecting the image correlation, prior to the compression and encoding. The use of such DCT calculation enables more precise detection of the correlation.

In the foregoing embodiments, the input image signal is assumed to be an NTSC interlaced signal, but the process mode may be determined according to the video data format. For example there may be employed the field process for the signals of the current television systems based on the interlaced method, and the frame process for the high image quality television systems such as HDTV (high definition television), as the image in such systems is principally taken with non-interlaced cameras.

In the foregoing embodiments, in dividing the image data into blocks, the block configuration is determined by the information on the block formation applied previously to said image data. It is therefore rendered possible to divide the image data again into blocks in a configuration similar to that in the previous block formation, and, by the application of the present invention for example to a digital VTR employing block encoding, there can be prevented the image signal deterioration resulting from the difference in the block configuration at the re-encoding.

It is also possible to prevent the image quality deterioration at the re-encoding, by determining the block configuration utilizing the result of estimation of the previous block configuration.

Furthermore, at the block formation, the previous block configuration is estimated for the image data that have been previously subjected to block formation, and the correlation is detected in the image for the image data that have not been subjected to such block formation, and the process mode in the block formation and compression encoding is determined according to the result of such estimation or detection. It is therefore rendered possible to prevent the image quality deterioration at the repeated block formation and to divide the image data into blocks of a configuration matching the state of the input image signal, thereby realizing optimum compression encoding.

In the following there will be explained a 4th embodiment of the present invention, with reference to FIG. 11 which is a block diagram of a digital VTR embodying the present invention in which components equivalent to those in the foregoing embodiments are represented by the same numbers. In the present embodiment, the 1st mode estimation circuit is omitted, but such circuit may naturally be provided also in this embodiment.

In the circuit shown in FIG. 11, the image signal, supplied from the frame memory 106 in the unit of a frame and in a block of 8 pixels in the vertical direction and 8 pixels in the horizontal direction, is supplied through a switch 135 to a gain control circuit 136.

The gain control circuit 136 effects control on the level of the input image signal, as will be explained later, and sends said signal to the field memory 107 and the mode discrimination circuit 131. Also the mode discrimination signal, either entered from the terminal 105 or generated as explained before by the mode discrimination circuit 131 is supplied, through a switch 110, to the block forming circuit 113, code amount control circuit 137 and compression/encoding circuit 115.

The code amount control circuit 137 is provided for supplying the compression/encoding circuit 115 with a control signal for controlling the data to be recorded to a data amount matching the employed format. More specifically, the code amount is controlled by the control of a quantizing coefficient at the quantization.

The image reproduction is executed in the same manner as in the foregoing embodiments, and the reproduced image signal is stored in a frame memory 120. Said frame memory 120 effects a deshuffling process to rearrange the input image signal in the original data sequence and sends said rearranged data to a D/A conversion circuit 121, which converts said signal to an analog signal for supply to an analog output terminal 124. Also the digital image signal is directly released from a digital output terminal 123.

Furthermore, the image signal read from the frame memory 120 is supplied, in the digital state, to a comparison circuit 132 and the terminal b of a switch 135.

In the following explained is the level control for the image signal in the gain control circuit 136.

The present embodiment effects level control of the input signal, prior to the recording process explained above, for the purpose of achieving the re-encoding process matching the encoding history of the input signal and the compensation for the transmission channel loss, and the high-quality recording and reproduction can be achieved by the optimum gain control of said gain control circuit 136.

More specifically, in the dubbing operation from another digital VTR, a representative image frame within the input images is subjected, as an example for gain control, to compression and encoding, and then to expansion and decoding. The deterioration in the image quality, after the above-explained operation is repeated for a predetermined number of times, is detected by the comparison circuit 132. This procedure is conducted for plural gains, and an optimum gain is selected from the obtained results.

These operations, controlled by the control circuit 112, will be explained with reference to a flow chart shown in FIGS. 12A and 12B.

At first a representative image in the input signal is fetched into the frame memory 106 through the A/D conversion circuit 102, and the switch 135 is shifted to the terminal a (S401). Then an input standby instruction is given to the equipment of the reproduction side, such as a digital VTR (S402). Subsequently the switches 138, 139 are shifted to the terminal b (S403), and an initial value is set as a candidate for the correcting gain ai of the gain control circuit 136 (S404). (In the present case, a gain a1 is set for a case i=1 (S405).) Also an initial value k=0 is set for the variable k, in order to count the number of the above-mentioned loops of encoding and decoding (S406).

As the switch 135 is connected to the terminal a in the step S401, the test image in the frame memory 106 (such as the image of the 1st frame, image after a predetermined time, image synthesized from plural frames within a predetermined period, or image recorded in advance for test purpose) is subjected to level control with the corrective gain a1 in the gain control circuit, then to compression and encoding as explained before and released to the switch 138 (S407). Since this is the first loop, the level control is conducted with the gain a1.

Since the switches 138, 139 are connected to the side b in the step S403, the compressed and encoded data are directly expanded and decoded, and the image is constructed in the frame memory 120 in the same manner as in the ordinary recording and reproducing operations (S408).

After the completion of the process loop to said step S408 is completed, the control circuit 112 increases the variable k by one (S409). Then the image signal is read from the frame memory 120, and supplied to the gain control circuit 136 through the terminal b of the switch 135, and the compression and expansion are thereafter conducted in a similar manner.

A step S410 discriminates whether said loop of level control, compression and expansion has been executed n times, and, if executed, the comparison process is initiated. The data subjected to the compression and expansion as explained above are read from the frame memory 120 and supplied to the comparison circuit 132. Also, the representative image from the frame memory 106 is supplied to the comparison circuit 132. Then the difference between these two data, indicating the image quality deterioration, is detected for example by the peak level value or the effective energy value, and is supplied to the control circuit 112 (S411).

After the comparison process, the number i of the corrective gain is increased by one (S412). Then there is discriminated whether the corrective gain i has been set m times, and the steps S405 to S412 are repeated until said number m is reached (S413). When the gain has been set by the predetermined number of times, the control unit 112 evaluates the image quality deterioration for the respective corrective gains and determines the optimum corrective gain among said gains (S414).

After the determination of the optimum corrective gain by the control circuit 112, the switches 135, 138, 139 are shifted to the side a, and the gain setting loop is cancelled (S415). Also, the stand-by state of the image information supplying equipment is cancelled. Then the input of the image information is initiated, and the level of the image data is controlled with the corrective gain determined in the above-explained process (S416).

As explained in the foregoing, the present embodiment corrects the gain according to the input image, thereby preventing the deterioration of the image quality at the re-encoding.

In the following there will be explained, with reference to a schematic chart in FIG. 13, the improvement in sensitivity of detection of the corrective gain, in response to an increase in the number of loops consisting of the steps S406 to S409 in FIGS. 12A and 12B.

In case a level change is given to the input signal at the re-encoding as in the present embodiment, the image quality becomes deteriorated with the increase in the number of re-encodings, so that the level of image quality deterioration becomes different for each corrective gain.

Figure 13:
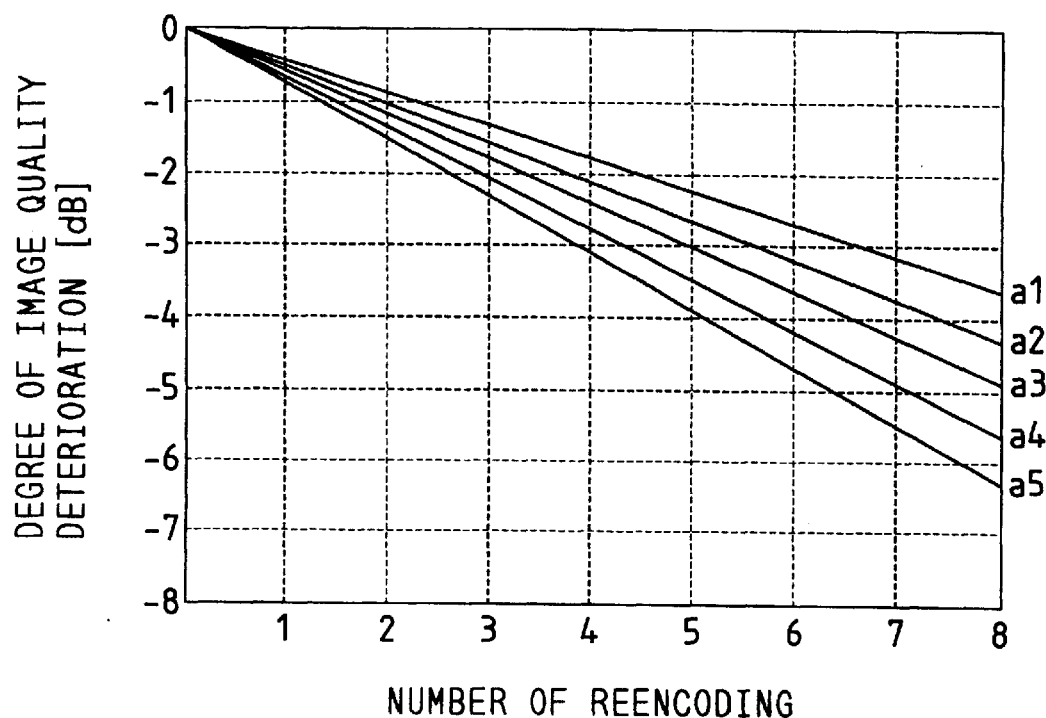
FIG. 13 is a chart showing the relationship between the correcting gain and the image quality deterioration.

If a level change already exists at the signal entry, the image quality deteriorates progressively with the repetition of the encoding operation, as indicated by a line a3 in FIG. 13, if the gain control is not conducted. On the other hand, if a certain gain correction is applied in a direction to compensate said level change, the image quality deterioration becomes less, as indicated by a line a2. A line a1 indicates a stronger level of correction, and corresponds to the corrective gain providing the best result in FIG. 13. Thus, the corrective gain a1 is selected in the above-explained embodiment. In this manner the sensitivity of the corrective gain increases with an increase in the number of loops.

On the other hand, if the gain is varied in a direction opposite to the above-explained gain correction, the image quality deteriorates more strongly with the increase in the number of encodings, as indicated by lines a4 and a5.

Figure 14:
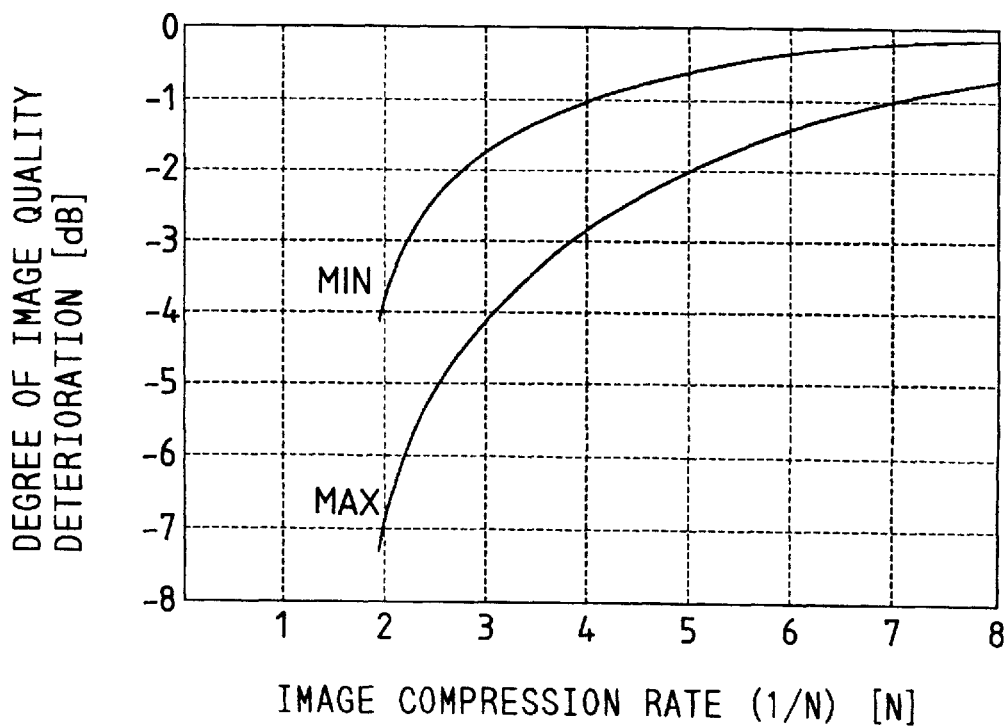
FIG. 14 is a chart showing the relationship between compression rates at plural correcting gains and the image quality deterioration.

FIG. 14 shows the relationship between the image quality deterioration and the compression rate, when the above-explained process loop is repeated about 10 times. In FIG. 14, lines Min and Max respectively indicate cases where the gain is so set as to minimize or maximize the image quality deterioration.

FIG. 14 indicates that, though the level of image quality deterioration varies depending on the direction and intensity of gain correction, the image quality deteriorates more strongly as the compression rate becomes smaller.

As will be understood from FIG. 14, the improvement on image quality by the gain correction is more marked for the case of low compression rate, corresponding to the high image quality. In the foregoing embodiment the corrective gain is determined from five candidate values, it is also conceivable, for obtaining the optimum value, to vary the number of candidate values according to the compression rate, and to vary the corrective gain in smaller steps in the recording/reproduction with a low compression rate.

It is also possible to determine, in advance, the number of candidates of the corrective gain depending on the compression rate, such as 5 candidates for a compression rate of ⅛, 7 candidates for a compression rate of ¼ and 9 candidates for a compression rate of ½.

Such variation of the number of candidates for the corrective gain according to the compression rate enables determination of the optimum corrective gain corresponding to the compression rate.

It is furthermore possible to set an optimum gain after 5 to 10 loops, then to set new candidates in smaller steps around said optimum gain, and to again effect a predetermined number of loops for arriving at an even better optimum gain.

Figure 15:
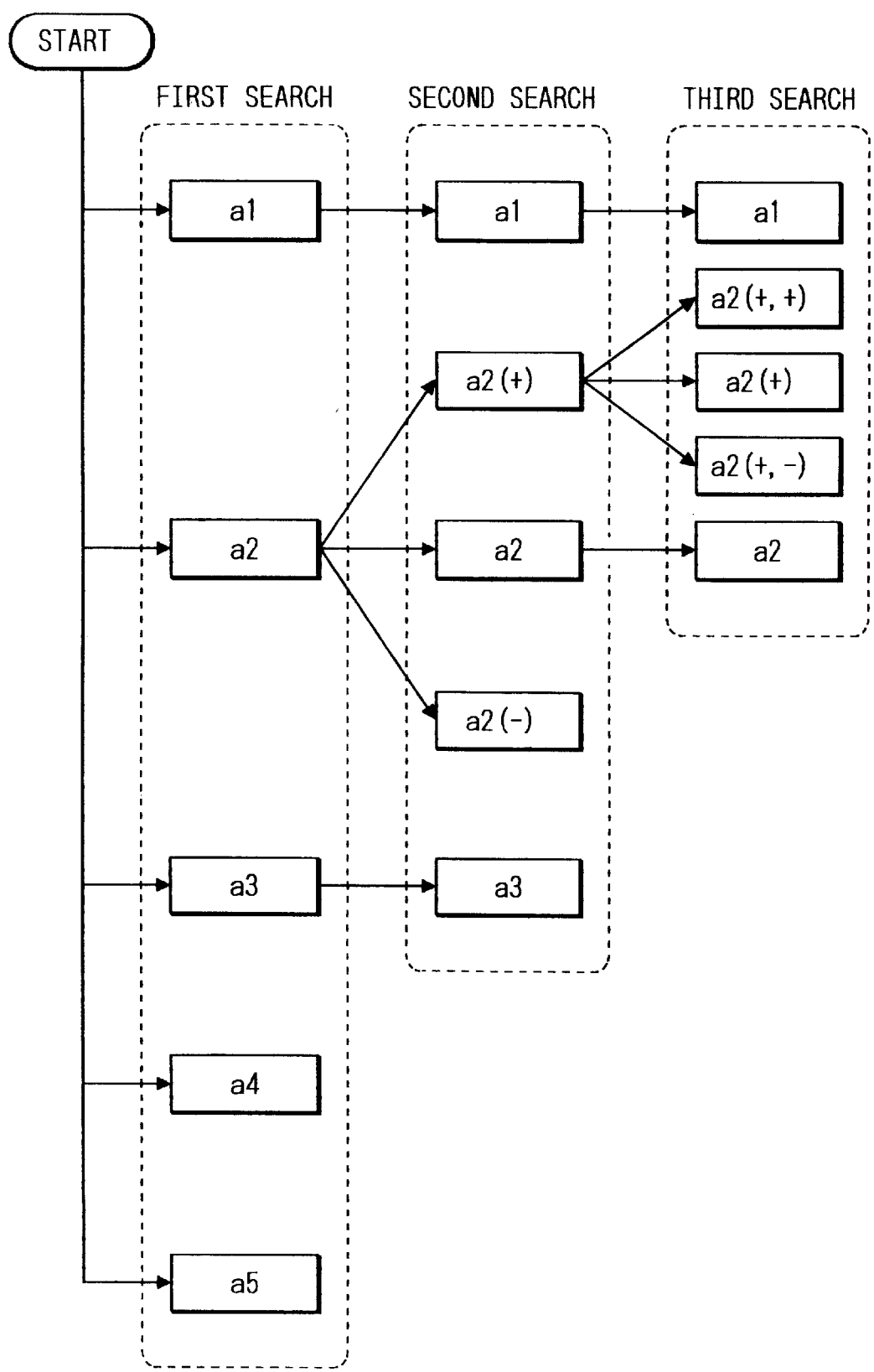
FIG. 15 is a view showing another example of correcting gain determination in the apparatus shown in FIG. 11.

Such optimum searching method is shown in FIG. 15. Each search is conducted with five candidates for the corrective gain, and the next search is conducted on the optimum value in the preceding search and two new candidates added on each side of said optimum value.

FIG. 15 shows the route to the selection of a value a2 (+, −) through three searches.

In the following there will be explained the use of memory in the aforementioned process loop for determining the corrective gain. In the comparison process of the present embodiment, the representative image as the reference and the decoded image as the result of simulation have to be stored. In the configuration shown in FIG. 11, these images are stored in the input frame memory 106 and the decoding frame memory 120, which are used also in the ordinary image processing.

Figure 16:
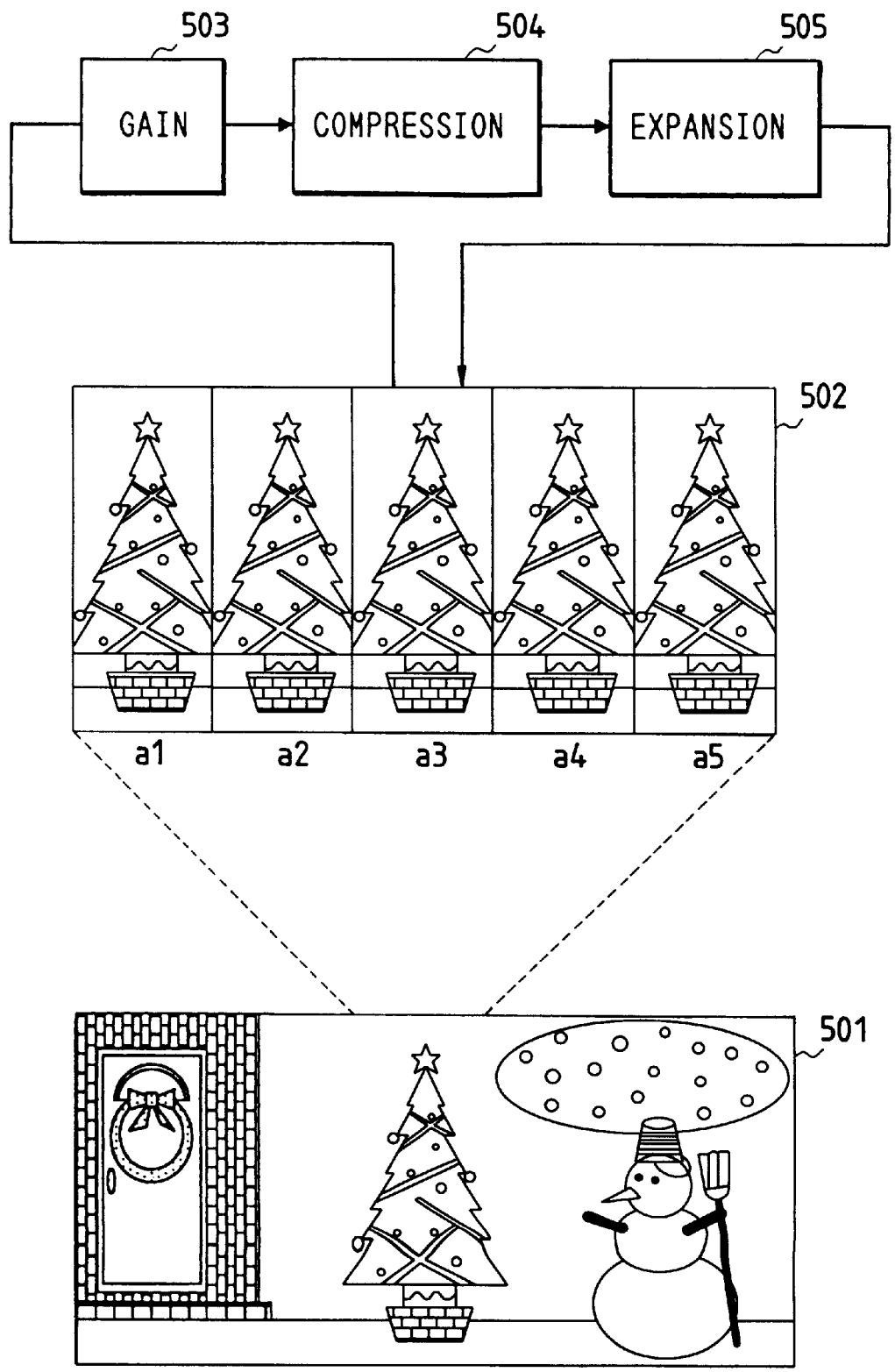
FIG. 16 is a view showing the mode of use of memory in the apparatus shown in FIG. 11.

Now, reference is made to FIG. 16, for explaining the method of dividing the memory for respective corrective gains, in the storage of the representative image in the frame memory 120.

An image, after a predetermined time from the start of the input image signal (for avoiding the image inadequate for simulation, such as a title image or a color bar image), is stored in the frame memory 106 as the representative image 501. Then the decoding frame memory 120 is equally divided into plural areas matching the number of the candidates for the corrective gain, and an image signal 502 selected in the central part of said image 501 and corresponding to said equally divided area is read from the frame memory 106 and is subjected to the above-mentioned loop process.

Said loop process is conceptually shown in the upper part of FIG. 16. The decoding frame memory 120 is equally divided into five areas a1–a5, in which respectively stored are decoded images, obtained by level controls with respective corrective gains a1–a5 on the image 502 at the center of the image 501.

Stated differently, each of the five areas of the frame memory 120 is subjected to the above-mentioned loop process n times, with one of the corrective gains a1–a5.

Figure 12A:
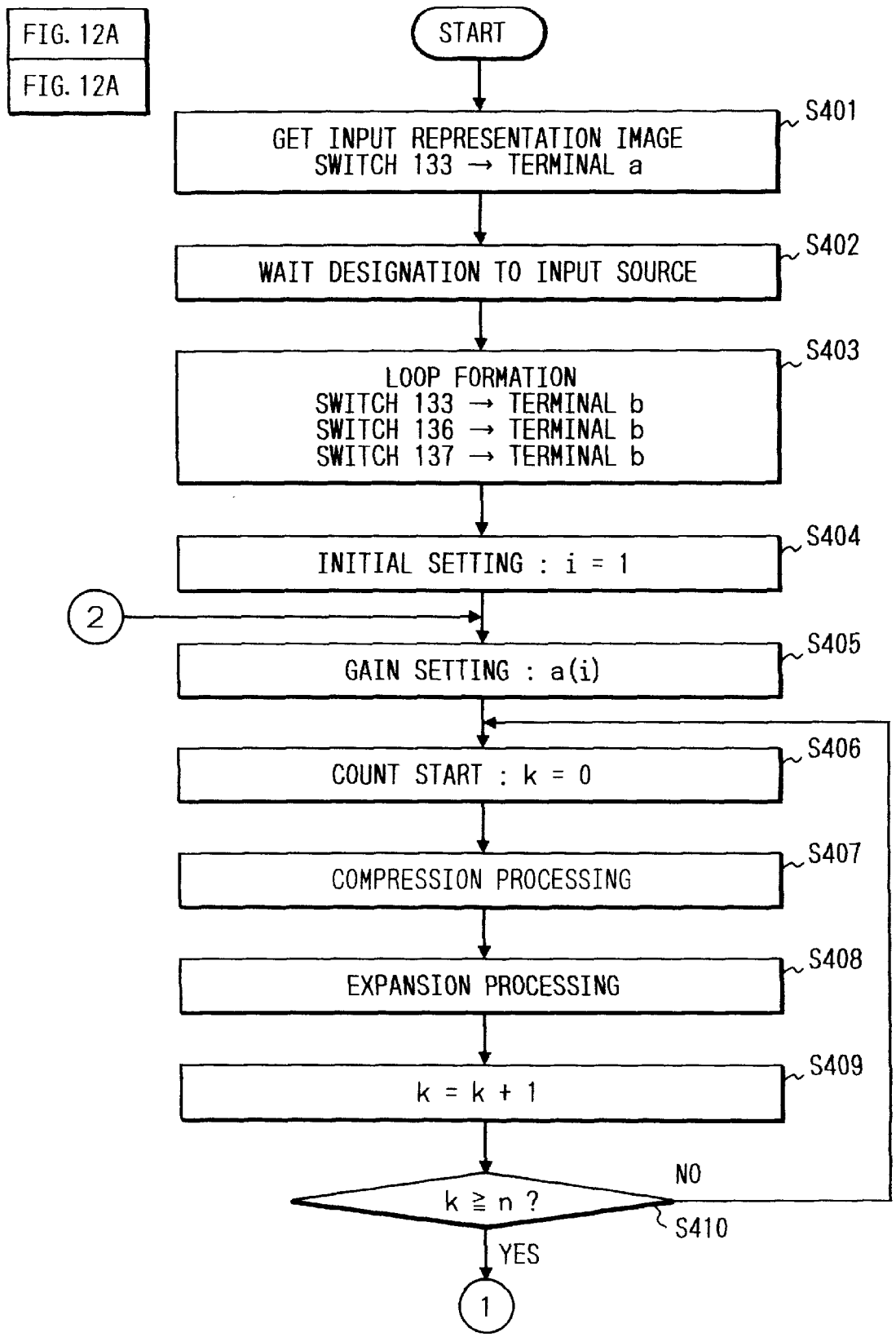
FIG. 12 is comprised of FIGS. 12A and 12B showing flow charts showing the sequence of correcting gain determination in the apparatus shown in FIG. 11.
Figure 17:
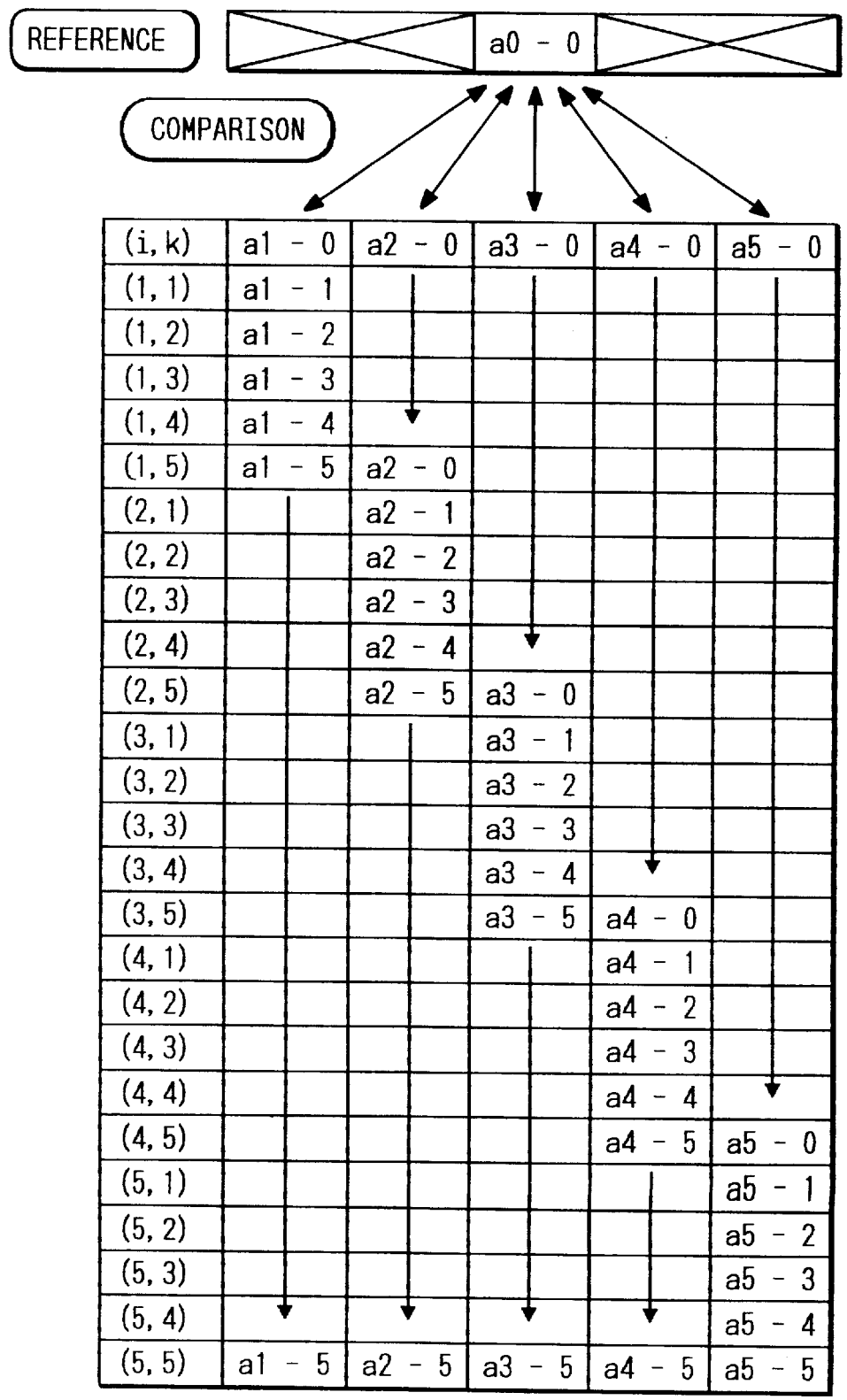
FIG. 17 is a view showing the function of the memory shown in FIG. 16.

FIG. 17 shows the content of the frame memory 120 in each step in the above-explained process, wherein the variables i, k are same as those in FIGS. 12A and 12B. The five columns in the lateral direction correspond to the five areas in the memory 120, and each column indicates the gain and the number of loop processes for the stored image signal.

As shown in FIG. 17, the images processed with different gains are stored in succession in the frame memory 120, and are finally compared with the central portion of the image 501 stored in the frame memory 106. In this example, n and m are both equal to 5.

In this manner the frame memory 120 can be utilized for realizing the present invention, without the addition of a new frame memory, whereby an increase in the magnitude of the hardware can be avoided.

Figure 18:
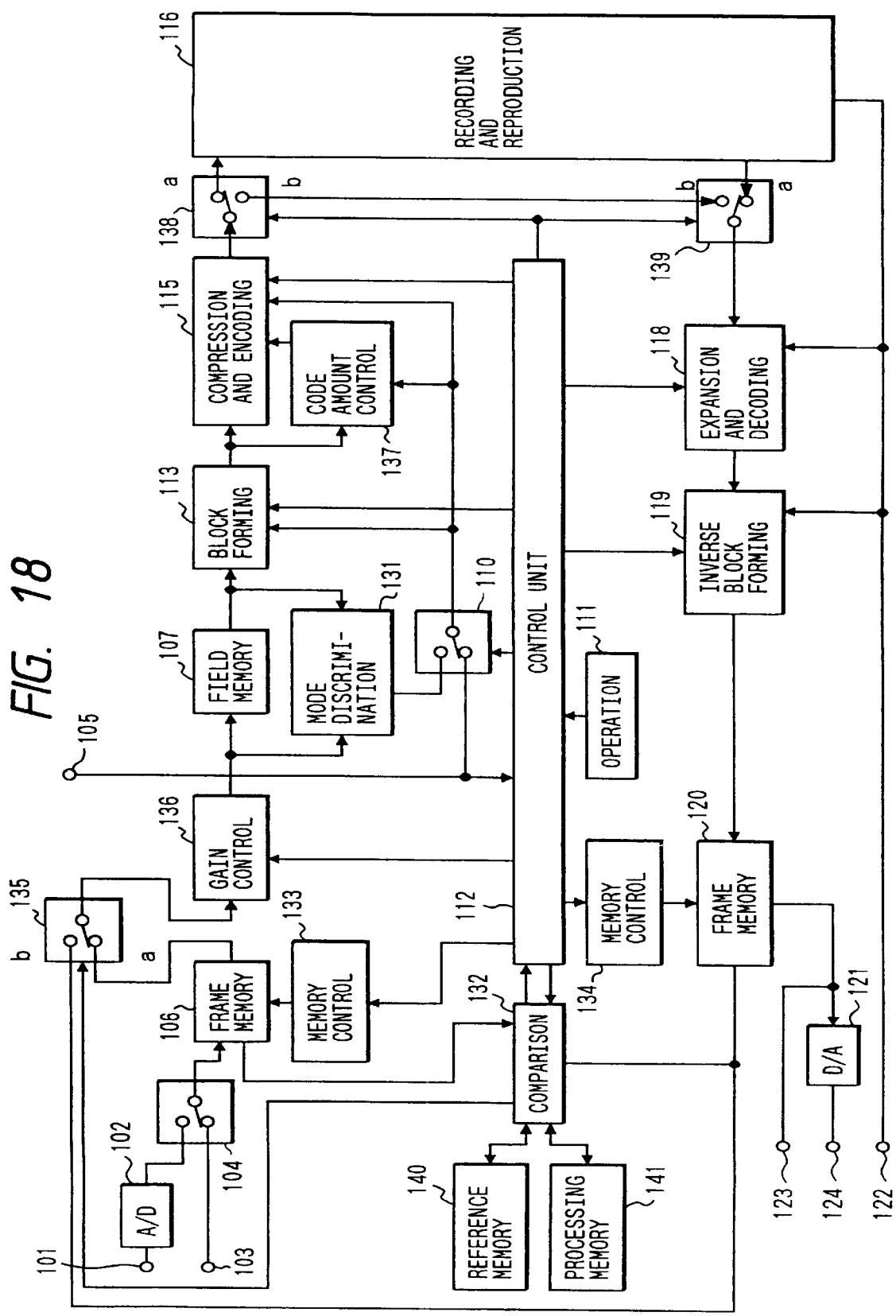
FIG. 18 is block diagram of a digital VTR constituting a fifth embodiment of the present invention.

FIG. 18 shows a configuration in case the frame memory is not utilized in the above-mentioned manner. The basic function is same as that in case of FIG. 11, but, because of the presence of a reference memory 140 and a process memory 141 exclusive for the image quality comparison, the function of the memory control circuits 133, 144 can be simplified. It is also possible to set a corrective gain by an initial simulation, and to correct the corrective gain even after the start of moving image processing, by repeating the simulation in the non-recording state such as the recording stand-by state.

The embodiment explained above can prevent the deterioration in the image quality at the re-encoding, by gain correction according to the entered image. Also, the corrective gain can be determined very promptly, since the simulation for corrective gain determination is conducted without utilizing the recording/reproduction system.

The equipment supplying the image signal is not limited to the digital VTR but can be any equipment capable of supplying image data that have once been encoded.

Also, the image signal need not necessarily be supplied from an equipment such as a VTR. The present invention is applicable and likewise effective also in case the compressed and encoded signal is supplied as a wireless signal, as in the ordinary television system.

What is claimed is:

1. An image processing apparatus, comprising:

receiving means for receiving an image signal which has been (i) blocked-encoded by dividing it into a plurality of blocks and then (ii) block-decoded from the plurality of encoded blocks, and for receiving mode information used in the block-encoding processing performed on the received image signal from outside of said image processing apparatus, and for outputting the received image signal and the received mode information, said receiving means outputting the received mode information without using the received image signal; and block encoding means for block-encoding said received image signal output from said receiving means by using the received mode information output from said receiving means.

2. An apparatus according to claim 1, further comprising:

generation means for generating mode information, utilizing said received image signal;

wherein said block encoding means is capable of effecting the block encoding process according to the mode information from said generation means.

3. An apparatus according to claim 2, further comprising:

control means for supplying one of said received mode information output from said receiving means and the mode information from said generation means to said block encoding means.

4. An apparatus according to claim 3, further comprising:

encoding means for compressing the amount of information of the image signal from said block encoding means and encoding the image signal; and wherein said encoding means encodes according to the output from said control means.

5. An apparatus according to claim 4, further comprising:

record/reproduction means for recording the image signal from said encoding means and the mode information from said control means, and for reproducing the recorded image signal and the recorded mode information.

6. An apparatus according to claim 5, further comprising:

decoding means for expanding the amount of information of the image signal reproduced by said record/reproduction means, and for decoding the reproduced image signal;

1st output means for outputting the image signal from said decoding means; and

2nd output means for outputting, to an outside of said apparatus, the mode information reproduced by said record/reproduction means.

7. An apparatus according to claim 3, wherein said control means is adapted to effect said supplying operation according to the kind of said received image signal output from said receiving means.

8. An apparatus according to claim 2, wherein said generation means includes correlation detection means for detecting a correlation between mutually different images in said received image signal.

9. An apparatus according to claim 2, wherein said generation means includes estimation means for estimating the mode of block encoding processing applied to said received image signal before said received image signal is output from said receiving means.

10. An apparatus according to claim 1, wherein said received image signal includes a frame consisting of plural fields, and wherein said block encoding means is adapted to selectively form a frame block consisting of the pixels of said plural fields or a field block consisting solely of the pixels of a predetermined field within said plural fields, according to said received mode information.

11. An image processing apparatus, comprising:

a) level control means for controlling the level of an input digital image signal;

b) compression means for compressing the amount of information of the digital image signal from said level control means by a block-encoding method;

c) expansion means for expanding the amount of information of the digital image signal compressed by said compression means by a block-decoding method corresponding to the block-encoding method;

d) detection means for detecting the deterioration in image quality of said input digital image signal due to the compression process and the expansion process by performing the compression process by the block-encoding method and expansion process by the block-decoding process, in succession; and e) control means for controlling said level control means according to the output of said detection means.

12. An apparatus according to claim 11, wherein said detection means includes comparison means for comparing the image quality of the image signal from said expansion means and that of said input digital image signal, and is adapted to detect said deterioration in image quality, based on the output of said comparison means.

13. An apparatus according to claim 12, wherein said compression means is capable also of compressing the image signal from said expansion means, and wherein said comparison means is adapted to compare (i) the image signal from said expansion means, obtained by applying compression and expansion plural times on said input digital image signal, and (ii) said input digital image signal.

14. An apparatus according to claim 11, wherein said control means is adapted to control said detection means so as to vary the method of detection before said deterioration in image quality, according to the compression rate in said compression means.

15. An apparatus according to claim 11, further comprising:

record/reproduction means for recording the image signal from said compression means and reproducing the recorded signal;

wherein said expansion means is adapted also to expand the amount of information of the image signal reproduced by said record/reproduction means.

16. An image processing apparatus, comprising:

level control means for controlling the level of an input image signal, said input image signal being an image signal that has been blocked-formed by dividing it into a plurality of blocks and then reconstructed from the plurality of blocks;

information input means for inputting mode information associated with said input image signal, said mode information indicating a mode of block-forming processing performed on the image signal before the image signal is input to said apparatus;

block forming means for dividing the input image signal into a plurality of blocks, each block comprising a plurality of pixels, according to the mode information input by said information input means;

information input means for entering block formation information relating to said block forming process applied previously on said input image signal;

wherein said block forming means is adapted to effect said block forming process according to the block formation information from said information input means;

compression means for compressing an amount of information of the image signal from said block forming means;

expansion means for expanding the amount of information of the image signal from said compression means;

wherein said compression means and said expansion means vary said compression process and said expansion process respectively, according to the mode information;

detection means for detecting a deterioration in image quality of said input image signal by performing said compression and expansion processes on said input image signal in succession; and control means for controlling said level control means according to the output of said detection means.

17. An apparatus according to claim 16, further comprising:

generation means for generating the mode information, utilizing said image signal; and wherein said block forming means is capable of effecting said block forming process, according to the mode information from said generation means.

18. An apparatus according to claim 16, wherein said detection means includes comparison means for comparing (i) the image quality of the image signal from said expansion means and (ii) said input image signal, and wherein said detection means is adapted to detect said deterioration in image quality based on the output of said comparison means.

19. A reproducing apparatus, comprising:

reproduction means for reproducing (i) an image signal divided into a plurality of blocks each of which comprises a plurality of pixels encoded in the block unit, and (ii) mode information recorded after a dividing process performed to form said plurality of blocks, from a recording medium;

decoding means for decoding said plurality of encoded blocks of the image signal reproduced by said reproducing means, by using the mode information reproduced by said reproducing means; and output means for outputting the mode information to an outside of said reproducing apparatus together with the image signal decoded by said decoding means so that the mode information output from said output means can be used to divide the decoded image signal output together with the mode information, into a plurality of blocks again.

20. An apparatus according to claim 19, further comprising:

inverse block forming means for arranging said image signal in a predetermined sequence of pixels, according to the mode information from said reproduction means.

21. An apparatus according to claim 19, wherein said image signal is recorded, with a compression in the amount of information, on said recording medium.

22. An apparatus according to claim 21, further comprising:

expansion means for expanding the amount of information of the image signal from said reproduction means;

wherein said expansion means is adapted to vary the expansion process according to said mode information.

23. An apparatus according to claim 22, wherein said expansion means is adapted to vary the sequence of pixels to be subjected to said expansion process, according to said mode information.

24. An apparatus according to claim 22, further comprising:

image output means for outputting the image signal from said expansion means to an outside of said apparatus.

25. An image processing apparatus, comprising:

receiving means for receiving an image signal, and for outputting the received image signal to encoding means, said receiving means receiving a decoded image signal as the received image signal; and mode information supplying means for acquiring encoding mode information associated with the image signal received by said receiving means, and for supplying the acquired encoded mode information to a recording means, said supplying means acquiring the encoding mode information without using the image signal received by said receiving means, said encoding means encoding the decoded image signal output from said receiving means, by using the encoding mode information supplied from said mode information supplying means.

26. Apparatus according to claim 25, wherein said encoding means includes means for dividing the received image signal into a plurality of blocks each comprising a plurality of pixels, and for performing an encoding processing on a block basis.

27. Apparatus according to claim 25, wherein said encoding means further compresses amount information of the received image signal.

28. Apparatus according to claim 25, further comprising recording means for recording on a recording medium the image signal encoded by said encoding means.

* * * * *

UNITED STATES PATENT AND TRADEMARK OFFICE
CERTIFICATE OF CORRECTION

PATENT NO.     : 6,243,139 B1
DATED          : June 5, 2001
INVENTOR(S)    : Koji Takahashi et al.

It is certified that error appears in the above-identified patent and that said Letters Patent is hereby corrected as shown below:

Column 1,
Line 15, "there of" should read -- thereof --.

Column 13,
Line 4, "blocked-encoded" should read -- block-encoded --.

Column 14,
Line 52, "blocked-formed" should read -- block-formed --.

Column 16,
Line 31, "to" should read -- for recording on --; and
Line 32, "means," should read -- medium, --.

Signed and Sealed this

Ninth Day of April, 2002

Attest:

JAMES E. ROGAN
Attesting Officer     Director of the United States Patent and Trademark Office